United States Patent
Jin et al.

(10) Patent No.: US 10,895,536 B1
(45) Date of Patent: Jan. 19, 2021

(54) METHOD FOR PREPARING A RATIOMETRIC FLUORESCENT SENSOR FOR PHYCOERYTHRIN BASED ON A MAGNETIC MOLECULARLY IMPRINTED CORE-SHELL POLYMER

(71) Applicant: Qingdao University, Qingdao (CN)

(72) Inventors: Hui Jin, Qingdao (CN); Rijun Gui, Qingdao (CN); Yongxin Fu, Qingdao (CN); Xiangning Bu, Qingdao (CN)

(73) Assignee: QINGDAO UNIVERSITY, Qingdao (CN)

( * ) Notice: Subject to any disclaimer, the term of this patent is extended or adjusted under 35 U.S.C. 154(b) by 0 days.

(21) Appl. No.: 16/620,690

(22) PCT Filed: Mar. 14, 2019

(86) PCT No.: PCT/CN2019/078077
§ 371 (c)(1),
(2) Date: Dec. 9, 2019

(87) PCT Pub. No.: WO2020/093639
PCT Pub. Date: May 14, 2020

(30) Foreign Application Priority Data

Nov. 8, 2018 (CN) .......................... 2018 1 1325300

(51) Int. Cl.
*G01N 21/64* (2006.01)
*G01N 27/00* (2006.01)
(Continued)

(52) U.S. Cl.
CPC ......... *G01N 21/6428* (2013.01); *C08G 77/26* (2013.01); *C08K 3/22* (2013.01);
(Continued)

(58) Field of Classification Search
CPC ....... G01N 21/6428; G01N 2021/6439; G01N 2600/00; C08G 77/26; C08K 3/22;
(Continued)

(56) References Cited

U.S. PATENT DOCUMENTS

| 2005/0214876 A1 | 9/2005 | Bright |
| 2017/0355797 A1 | 12/2017 | Grenier et al. |

FOREIGN PATENT DOCUMENTS

| CN | 102012358 A | 4/2011 |
| CN | 103739846 A | 4/2014 |

(Continued)

OTHER PUBLICATIONS

Lapresta-Fernandez et al. Magnetic and fluorescent core-shell nanoparticles for ratiometric pH sensing. Nanotechnology, 2011, vol. 22, pp. 1-7 (Year: 2011).*

(Continued)

*Primary Examiner* — Shafiqul Haq
(74) *Attorney, Agent, or Firm* — Bayramoglu Law Offices LLC

(57) ABSTRACT

A method for preparing a ratiometric fluorescent sensor for phycoerythrin based on a magnetic molecularly imprinted core-shell polymer is provided. With $Fe_3O_4$ magnetic nanoparticles as the core, blue fluorescence-emitting carbon quantum dots (B-CDs) are coupled on the surfaces of $Fe_3O_4$ magnetic nanoparticles, and $SiO_2$ shells carrying template molecules (phycoerythrin) are grown on the surfaces of $Fe_3O_4$/B-CDs. Then, the molecularly imprinted polymer $SiO_2$-MIPs are obtained by eluting the template molecules, that is, $Fe_3O_4$/B-CDs/$SiO_2$-MIPs are obtained. Fluorescence emission spectra of the dispersion of $Fe_3O_4$/B-CDs/$SiO_2$-MIPs in the presence of different concentrations of phycoerythrin are measured. By fitting the linear relationship between the ratios $I_{phycoerythrin}/I_{B-CDs}$ of fluorescence emis- (Continued)

sion peak intensities of phycoerythrin and B-CDs and the molar concentrations of phycoerythrin, the ratiometric fluorescent sensor for phycoerythrin is constructed.

4 Claims, 1 Drawing Sheet

(51) Int. Cl.
*C08K 3/22* (2006.01)
*C09K 11/02* (2006.01)
*C09K 11/06* (2006.01)
*C08G 77/26* (2006.01)

(52) U.S. Cl.
CPC ............ *C09K 11/025* (2013.01); *C09K 11/06* (2013.01); *C08K 2003/2275* (2013.01); *C08K 2201/01* (2013.01); *C09K 2211/14* (2013.01); *G01N 2021/6439* (2013.01); *G01N 2600/00* (2013.01)

(58) Field of Classification Search
CPC ........ C08K 2003/2275; C08K 2211/14; C09K 11/025; C09K 11/06
See application file for complete search history.

(56) References Cited

FOREIGN PATENT DOCUMENTS

| CN | 104075925 | A | 10/2014 |
|---|---|---|---|
| CN | 104277176 | A | 1/2015 |
| CN | 104356323 | A | 2/2015 |
| CN | 104926981 | A | 9/2015 |
| CN | 105385438 | A | 3/2016 |
| CN | 106084232 | A | 11/2016 |
| CN | 106198478 | A | 12/2016 |
| CN | 106442436 | A | 2/2017 |
| CN | 106540668 | A | 3/2017 |
| CN | 106833646 | A | 6/2017 |
| CN | 107421937 | A | 12/2017 |
| CN | 108037103 | A | 5/2018 |
| CN | 108383936 | A | 8/2018 |
| CN | 108414740 | A | 8/2018 |
| CN | 109406473 | A | 3/2019 |

OTHER PUBLICATIONS

Ming Weina et al., Preparation and Applications of Core-Shell Molecularly Imprinted Polymers, Progress in Chemistry, 2016, p. 552-563, 28-4.

Jiang Ruyuan et al. Progress in Applications of Surface Molecular Imprinting Sensors, 2017, p. 341-348, China Academic Journal Electronic Publishing House.

Shuang Han et al., A core-shell Fe3O4 nanoparticle-CdTe quantum dot-molecularly imprinted polymer composite for recognition and separation of 4-nonylphenol, Analytical Methods, 2014, 6, p. 2855-2861.

Jinhua Li et al., Thermosensitive molecularly imprinted core-shell CdTe quantum dots as a ratiometric fluorescence nanosensor for phycocyanin recognition and detection in seawater, Analyst, 2018, p. 3570-3578, 143, The Royal Society of Chemistry.

Zhong Zhang et al., Quantum Dots Based Mesoporous Structured Imprinting Microspheres for the Sensitive Fluorescent Detection of Phycocyanin, ACS Applied Materials & Interfaces, 2015, 7, p. 9118-9127.

Mathilde Munier et al., One-step purification of R-phycoerythrin from the red edible seaweed *Grateloupia turuturu*, Journal of Chromatography B, 2015, p. 23-29, 992.

Carla Gameiro et al., Characterisation of estuarine intertidal macroalgae by laser-induced fluorescence, Estuarine, Coastal and Shelf Science, 2015, p. 119-124, 167.

Weijie HE, Ratiometric fluorescence and visual imaging detection of dopamine based on carbon dots/copper nanoclusters dual-emitting nanohybrid, Talanta, 2018, 109-115, 178.

\* cited by examiner

METHOD FOR PREPARING A RATIOMETRIC FLUORESCENT SENSOR FOR PHYCOERYTHRIN BASED ON A MAGNETIC MOLECULARLY IMPRINTED CORE-SHELL POLYMER

CROSS REFERENCE TO THE RELATED APPLICATIONS

This application is the national phase entry of International Application No. PCT/CN2019/078077, filed on Mar. 14, 2019, which is based upon and claims priority to Chinese Patent Application No. 201811325300.1, filed on Nov. 8, 2018, the entire contents of which are incorporated herein by reference.

TECHNICAL FIELD

The present disclosure belongs to the technical field of preparation of nano composite material and molecularly imprinted polymer, and more particularly to a method for preparing a ratiometric fluorescent sensor for phycoerythrin based on a magnetic molecularly imprinted core-shell polymer. The prepared sensor can be used for detecting phycoerythrin with high sensitivity and high selectivity.

BACKGROUND

Red tide that is caused by blooming red algae on the ocean surface is a serious matter and causes increasing concerns for human health and water resources. Phycoerythrin, one of the important light-harvesting pigment-proteins in algae, together with Phycocyanin and allophycocyanin, constitute the fluorescent family of phycobiliprotein. These proteins are part of an efficient energy transfer chain, which direct excitation energy of light-harvesting complex to a chlorophyll-containing reaction center with a light energy transmission efficiency of 95%. Phycoerythrin is mainly obtained by separation and purification from red algae and has strong fluorescence, good light absorption characteristics, high quantum yield, extensive excitation and emission in the visible light region and the like. The phycoerythrin can be widely used in the technical fields of diagnosis and bioengineering, such as fluorescence immunoassay, bicolor or multicolor fluorescence analysis, surface antigen detection of cancer cell, flow cytometry, antibody fluorescent labeling, bioimaging, food, cosmetics and the like. The precise detection of phycoerythrin is an important problem to be solved. It is very important to develop a simple and efficient method to identify and detect phycoerythrin.

Molecular imprinting technology can capture specific template molecules into polymer molecular cavities with high sensitivity and selectivity in the presence of specific template molecules. During the preparation process, removal of the template molecules by elution, causes specific sites to remain in the formed polymer network, and the shape and size of the specific sites match the template molecules. The complementary relationship between the specific sites of the molecularly imprinted polymer and the template molecules enables high-selectivity and specific detection of the template molecule. As a special type of receptor, the molecularly imprinted polymer has the advantages of simple preparation, low cost, good selectivity, high physical strength and good thermal stability, which has been widely used in many important fields such as chemical/biological sensor, chromatographic separation, solid phase extraction and drug release.

Munier et al. used a one-step purification from red edible seaweed to obtain R-phycoerythrin (Mathilde Munier, Michèle Morançais, Justine Dumay, Pascal Jaouen, Joël Fleurence. One-step purification of R-phycoerythrin from the red edible seaweed *Grateloupia Turuturu. Journal of Chromatography B*, 992 (2015) 23-29), wherein the R-phycoerythrin was detected by high performance liquid chromatography. Gameiro et al. performed fluorescence characterization on phycoerythrin (Carla Gameiro, Andrei B. Utkin, Paulo Cartaxana. Characterization of estuarine intertidal macroalgae by laser-induced fluorescence. Estuarine, Coastal and Shelf Science 167 (2015) 119-124). Jikui Wu et al. reported a method for detecting DNA hybridization using R-phycoerythrin fluorescence (Jikui Wu, Yunfei Lu, Ningna Ren, Junling Zhang. Method for detecting DNA hybridization by using surface cationized R-phycoerythrin. Chinese Invention Patent Publication No. CN108037103A) Hualin Wang et al. prepared a phycoerythrin-labeled polystyrene microsphere as a fluorescent probe (Hualin Wang, Tao Zhang, Kedeng Zhang. Method for preparing a fluorescent probe of a phycoerythrin-labeled polystyrene microsphere. Chinese Invention Patent. Publication No. CN108383936A).

At present, studies on Phycoerythrin focused on extraction, isolation, purification and use as fluorescent labeling probes, and the analysis and detection of phycoerythrin is limited to quantitative analysis using high performance liquid chromatography and fluorescence spectrometer. Traditional instrumental analysis techniques generally have problems such as having cumbersome sample pretreatment, complex operation, being time-consuming and laboursome, having low sensitivity and poor selectivity. The detection of phycoglobin, only relying on a single signal output, is susceptible to factors such as background, reagents, system and environmental conditions, resulting in fluctuations in the measurement results. In contrast, employing the dual-signal ratio processing to obtain the intensity ratio of the signals has a self-calibration function, which effectively eliminates the interference of the autologous signal and the background signal and improves the accuracy and reliability of the detection results. In this regard, the present disclosure reports a novel ratiometric fluorescent sensor for phycoerythrin based on a magnetic molecularly imprinted core-shell polymer. Using $Fe_3O_4$ magnetic nanoparticles as the cores, blue fluorescence-emitting carbon quantum dots (B-CDs) are coupled on the surface of $Fe_3O_4$ magnetic nanoparticles, and silica shells carrying template molecules (phycoerythrin) are grown on the surfaces of $Fe_3O_4$/B-CDs. Then, the molecularly imprinted polymer $SiO_2$-MIPs are obtained by eluting the template molecules, that is, $Fe_3O_4$/B-CDs/$SiO_2$-MIPs are obtained. The magnetic molecularly imprinted core-shell polymer can be used for ratiometric fluorescent detection of phycoerythrin with high sensitivity and selectivity. So far, constructing the ratiometric fluorescent sensor based on magnetic molecularly imprinted core-shell polymer $Fe_3O_4$/B-CDs/$SiO_2$-MIPs and the ratiometric fluorescent method for detecting phycoerythrin have not yet been reported on domestic and foreign literatures and patents.

SUMMARY

The objective of the present disclosure is to overcome the deficiencies of the prior art described above, and to design a method for preparing a ratiometric fluorescent sensor for phycoerythrin based on a magnetic molecularly imprinted core-shell polymer, where the method is simple, has low-cost, high-sensitivity and good-selectivity.

In order to achieve the aforementioned objective, according to the present disclosure, a process of preparing a ratiometric fluorescent sensor for phycoerythrin based on a magnetic molecularly imprinted core-shell polymer includes the following steps.

(1) Preparation of aminated B-CDs: taking 0.3 mL of 1,4-dioxane and 25 mL of catechol solution to mix well by ultrasound, transferring to a 50 mL high-pressure reactor with a polytetrafluoroethylene liner, heating and reacting at 180° C. for 12 hours to obtain a dark brown mixture. The prepared dark brown mixture is diluted with 20 mL of double-distilled water and centrifuged at 12,000 rpm to remove larger particles. The supernatant is collected and filtered through a 0.4 μm micro-filtration membrane, and the filtrate is dialyzed through a dialysis bag with a molecular weight cut-off of 1000 Da to remove the unreacted experimental materials. The solution in the dialysis bag is poured out, subjected to rotary evaporation to remove 90% of the liquid, and then dried in a vacuum to obtain B-CDs. The B-CDs is stored at 4° C. from light or dispersed in solution to prepare dispersing B-CDs for subsequent experiments.

(2) Preparation of carboxylated $Fe_3O_4$ magnetic nanoparticles: adding ferric chloride and ferrous chloride with a molar ratio of 2:1 into a 250 mL reaction flask to prepare a 100 mL mixed solution, adding 10 mL of ammonia water with a mass concentration of 25% into the reaction flask under $N_2$ protection, stirring rapidly to cause a reaction, adjusting the pH of the solution to alkaline with HCl, after 10 min of reaction, adding 10 mL of trisodium citrate solution. Then the reaction flask is placed in a water bath at 80° C., and is continuously stirred for reaction for 30 min. The reaction product is centrifuged, washed and dried to obtain $Fe_3O_4$. The $Fe_3O_4$ is stored at 4° C. from light or dispersed in solution to prepare a dispersing $Fe_3O_4$ for subsequent experiments.

(3) Preparation of magnetic molecularly imprinted core-shell polymers: adding 2 mL of B-CDs aqueous dispersion to 18 mL of aqueous dispersion containing 0.8 mL of $Fe_3O_4$, stirring and reacting for 30 min, adding template molecules (phycoerythrin) and 20 μL of 3-aminopropyltriethoxysilane, reacting continuously for 1 hour, then adding 40 μL of ammonia water and 40 μL of tetraethyl silicate, and reacting continuously away from light for 12 hours. The reaction product is centrifuged and washed three times with a solution consisting of ethanol and acetonitrile at a volume ratio of 8:2 to remove the template molecules, and then $Fe_3O_4$/B-CDs/$SiO_2$-MIPs are obtained by centrifugation, washing and drying. The magnetic molecularly imprinted core-shell polymers are dispersed in solution to prepare a dispersion for use.

(4) At room temperature and stirring magnetically, a certain dosage of phycoerythrin is added to the polymer dispersion to form a homogeneous mixture and then incubated away from light for 5 minutes. Fluorescence emission spectra of the homogeneous mixture in the presence of different concentrations of phycoerythrin are measured. By fitting a linear relationship between the ratios ($I_{phycoerythrin}/I_{B-CDs}$) of fluorescence emission peak intensities of phycoerythrin and the molar concentrations of phycoerythrin, the ratiometric fluorescent sensor for phycoerythrin is constructed.

In step (1), the size of the aminated B-CDs is 1-5 nm.

In step (2), the size of the carboxylated $Fe_3O_4$ magnetic nanoparticles is 10-30 nm.

In step (3), the mass concentration of the B-CDs is 1-10 mg/mL, the mass concentration of the $Fe_3O_4$ magnetic nanoparticles is 5-20 mg/mL, and the dosage of phycoerythrin is 0.5-1 μM.

In step (4), the linear detection range of the molar concentration of phycoerythrin is 1-500 nM, and the detection limit is 1-10 nmol/L.

The advantages of the present disclosure are as follows. The present application discloses a novel ratiometric fluorescent sensor for phycoerythrin based on a magnetic molecularly imprinted core-shell polymer. With $Fe_3O_4$ magnetic nanoparticles as the core, blue fluorescence-emitting carbon quantum dots (B-CDs) are coupled on the surfaces of $Fe_3O_4$ magnetic nanoparticles, and silica shells carrying template molecules (phycoerythrin) are grown on the surfaces of $Fe_3O_4$/B-CDs. Then, the molecularly imprinted polymer $SiO_2$-MIPs are obtained by eluting the template molecules, that is, $Fe_3O_4$/B-CDs/$SiO_2$-MIPs are obtained. Fluorescence emission spectra of the homogeneous mixture of $Fe_3O_4$/B-CDs/$SiO_2$-MIPs in the presence of different concentrations of phycoerythrin are measured. By fitting the linear relationship between the ratios ($I_{phycoerythrin}/I_{B-CDs}$) of fluorescence emission peak intensities of phycoerythrin and B-CDs and the molar concentrations of phycoerythrin, the ratiometric fluorescent sensor for phycoerythrin is constructed, which can be used for ratiometric fluorescent detection of phycoerythrin with high sensitivity and selectivity. Compared with the prior art, according to the present disclosure, the method has the advantages of having simple operation, low cost, extensive resources of raw materials, strong anti-interference ability of the ratiometric signal, good accuracy, high sensitivity and high selectivity, which can be developed into a novel ratiometric fluorescent sensor for the efficient detection of phycoerythrin.

DETAILED DESCRIPTION OF THE EMBODIMENTS

The present disclosure will be further described below in conjunction with the drawings and specific embodiments.

Embodiment 1

Figure 1:
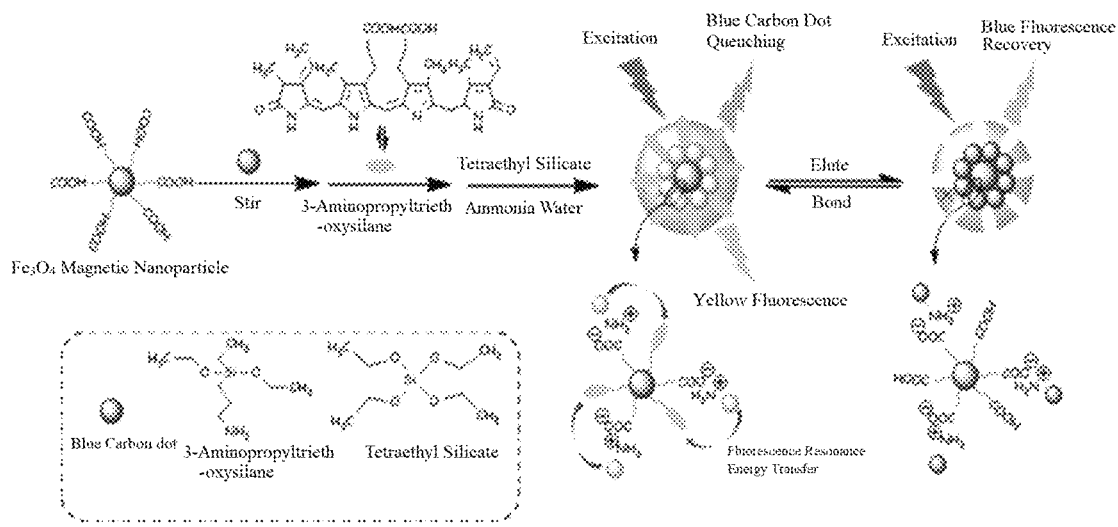
FIG. 1 is a schematic diagram showing the preparation for the ratiometric fluorescent sensor for phycoerythrin based on a magnetic molecularly imprinted core-shell polymer and the detection for phycoerythrin.

This embodiment relates to a method for preparing a ratiometric fluorescent sensor for phycoerythrin based on a magnetic molecularly imprinted core-shell polymer. A process of preparing the ratiometric fluorescent sensor and the principle of the ratiometric fluorescent detection of phycoerythrin are shown in FIG. 1, and the specific process steps are as follows.

Preparation of aminated B-CDs: 0.3 mL of 1,4-dioxane and 25 mL of catechol solution are chosen to be mixed well by ultrasound, and transferred to a 50 mL high-pressure reactor with a polytetrafluoroethylene liner. Heating and reacting is performed at 180° C. for 12 hours to obtain a dark brown mixture. The prepared dark brown mixture is diluted with 20 mL of double-distilled water and centrifuged at 12,000 rpm to remove larger particles. The supernatant is collected and filtered through a 0.4 μm micro-filtration membrane, and the filtrate is dialyzed through a dialysis bag with a molecular weight cut-off of 1000 Da to remove the unreacted experimental materials. The solution in the dialysis bag is poured out, subjected to rotary evaporation to remove 90% of the liquid, and then dried in a vacuum to obtain B-CDs. The B-CDs is stored at 4° C. from light or dispersed in solution to prepare dispersing B-CDs for subsequent experiments, wherein the average size of the B-CDs is 2 nm.

Preparation of carboxylated $Fe_3O_4$ magnetic nanoparticles: ferric chloride and ferrous chloride with a molar ratio of 2:1 are added into a 250 mL reaction flask to prepare a 100 mL mixed solution, 10 mL of ammonia water with a mass concentration of 25% is added into the reaction flask under $N_2$ protection, stirring rapidly for reaction, the pH of the solution is adjusted to alkaline with HCl, after 10 min of reaction, 10 mL of trisodium citrate solution is added. The reaction flask is placed in a water bath at 80° C., and is continuously stirred for reaction for 30 min. The reaction product is centrifuged, washed and dried to obtain $Fe_3O_4$. The $Fe_3O_4$ is stored at 4° C. from light or dispersed in solution to prepare a dispersing $Fe_3O_4$ for subsequent experiments, wherein the average size of $Fe_3O_4$ is 15 nm.

Preparation of magnetic molecularly imprinted core-shell polymers: 2 mL of B-CDs aqueous dispersion is added to 18 mL of aqueous dispersion containing 0.8 mL of $Fe_3O_4$, wherein the mass concentration of B-CDs is 2 mg/mL and the mass concentration of $Fe_3O_4$ magnetic nanoparticles is 10 mg/mL, after stirring and reacting for 30 min, template molecules (phycoerythrin) and 20 μL of 3-aminopropyltriethoxysilane are added, wherein the dosage of phycoerythrin is 0.5 μM, the reaction is continued for 1 hour, then 40 μL of ammonia water and 40 μL of tetraethyl silicate are added, and the reaction is carried out away from light for 12 hours. The reaction product is centrifuged and washed three times with a solution consisting of ethanol and acetonitrile at a volume ratio of 8:2 to remove the template molecules, and then $Fe_3O_4$/B-CDs/$SiO_2$-MIPs are obtained by centrifugation, washing and drying. The magnetic molecularly imprinted core-shell polymers are dispersed in solution to prepare a dispersion for use.

Figure 2:
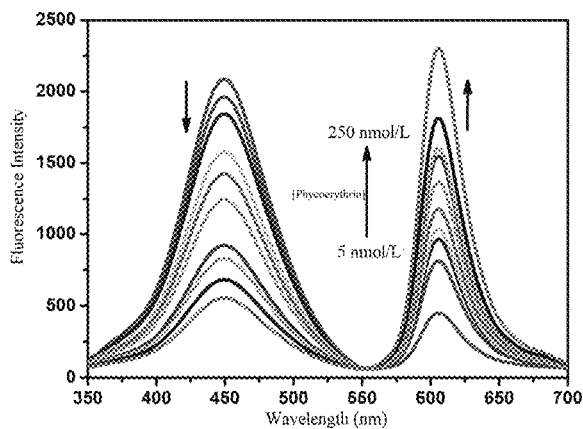
FIG. 2 shows the fluorescence emission spectra of sensor system measured by the ratiometric fluorescent sensor of the present disclosure, corresponding to different molar concentrations of phycoerythrin.
Figure 3:
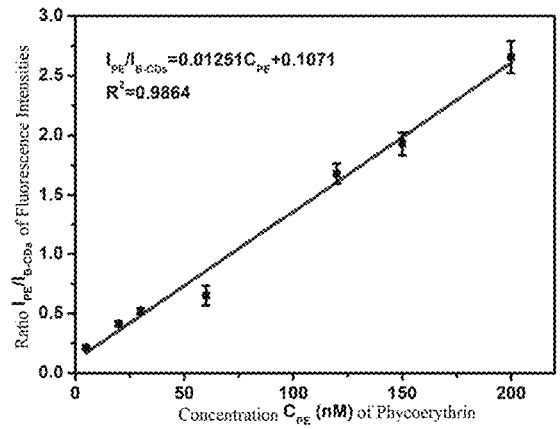
FIG. 3 shows the linear relationship between the ratios ($I_{phycoerythrin}/I_{B-CDs}$) of fluorescence emission peak intensities of phycoerythrin and B-CDs and the different molar concentrations of phycoerythrin.

At room temperature and stirring magnetically, a certain dosage of phycoerythrin is added to the polymer dispersion to form a homogeneous mixture and then incubated away from light for 5 minutes. Fluorescence emission spectra of the homogeneous mixture in the presence of different concentrations of phycoerythrin are measured. By fitting a linear relationship between the ratios ($I_{phycoerythrin}/I_{B-CDs}$) of fluorescence emission peak intensities of phycoerythrin and B-CDs and the molar concentrations of phycoerythrin, the ratiometric fluorescent sensor for phycoerythrin is constructed. FIG. 2 shows the fluorescence emission spectra of sensor system measured by the ratiometric fluorescent sensor of the present disclosure, corresponding to different molar concentrations of phycoerythrin. As shown in FIG. 3, the linear detection range of molar concentration of phycoerythrin obtained from the ratiometric fluorescent sensor of the present disclosure, is 5-250 nM, and the detection limit is 2 nM.

Embodiment 2: in this embodiment, the schematic diagram of the preparation process of the ratiometric fluorescent sensor and the principle of the ratiometric fluorescent detection of phycoerythrin are the same as embodiment 1, and the process steps for preparing aminated B-CDs and carboxylated $Fe_3O_4$ magnetic nanoparticles are also the same as embodiment 1, wherein the average size of B-CDs is 3 nm and the average size of $Fe_3O_4$ is 20 nm. Other specific process steps are as follows.

Preparation of magnetic molecularly imprinted core-shell polymers: 2 mL of B-CDs aqueous dispersion is added to 18 mL of aqueous dispersion containing 0.8 mL of $Fe_3O_4$, wherein the mass concentration of B-CDs is 5 mg/mL, and the mass concentration of $Fe_3O_4$ magnetic nanoparticles is 15 mg/mL, after stirring and reacting for 30 minutes, template molecules (phycoerythrin) and 20 μL of 3-aminopropyltriethoxysilane are added, wherein the dosage of phycoerythrin is 0.8 μM, the reaction is continued for 1 hour, then 40 μL of ammonia water and 40 μL of tetraethyl silicate are added, and the reaction is carried out away from light for 12 hours. The reaction product is centrifuged and washed three times with a solution consisting of ethanol and acetonitrile at a volume ratio of 8:2 to remove the template molecules, and then $Fe_3O_4$/B-CDs/$SiO_2$-MIPs are obtained by centrifugation, washing and drying. The magnetic molecularly imprinted core-shell polymers are dispersed in solution to prepare a dispersion for use.

At room temperature and stirring magnetically, a certain dosage of phycoerythrin is added to the polymer dispersion to form a homogeneous mixture and then incubated away from light for 5 minutes. Fluorescence emission spectra of the homogeneous mixture in the presence of different concentrations of phycoerythrin are measured. By fitting a linear relationship between the ratios ($I_{phycoerythrin}/I_{B-CDs}$) of fluorescence emission peak intensities of phycoerythrin and B-CDs and the molar concentrations of phycoerythrin, the ratiometric fluorescent sensor for phycoerythrin is constructed. The linear detection range of molar concentration of phycoerythrin is 5-500 nM, and the detection limit is 5 nM.

Embodiment 3: in this embodiment, the schematic diagram of the preparation process of the ratiometric fluorescent sensor and the principle of the ratiometric fluorescent detection of phycoerythrin, and the process steps for preparing aminated B-CDs and carboxylated $Fe_3O_4$ magnetic nanoparticles are all the same as embodiment 1, wherein the average size of B-CDs is 5 nm and the average size of $Fe_3O_4$ is 25 nm. Other specific process steps are as follows.

Preparation of magnetic molecularly imprinted core-shell polymers: 2 μL of B-CDs aqueous dispersion is added to 18 mL of aqueous dispersion containing 0.8 mL of $Fe_3O_4$, wherein the mass concentration of B-CDs is 8 mg/mL, and the mass concentration of $Fe_3O_4$ magnetic nanoparticles is 20 mg/mL, after stirring and reacting for 30 min, template molecules (phycoerythrin) and 20 μL of 3-aminopropyltriethoxysilane are added, wherein the dosage of phycoerythrin is 1 μM, the reaction is continued for 1 hour, then 40 μL of ammonia water and 40 μL of tetraethyl silicate are added, and the reaction is carried out away from light for 12 hours. The reaction product is centrifuged and washed three times with a solution consisting of ethanol and acetonitrile at a volume ratio of 8:2 to remove the template molecules, and then $Fe_3O_4$/B-CDs/$SiO_2$-MIPs are obtained by centrifugation, washing and drying. The magnetic molecularly imprinted core-shell polymers are dispersed in solution to prepare a dispersion for use.

At room temperature and stirring magnetically, a certain dosage of phycoerythrin is added to the polymer dispersion to form a homogeneous mixture and then incubated away from light for 5 minutes. Fluorescence emission spectra of the homogeneous mixture in the presence of different concentrations of phycoerythrin are measured. By fitting a linear relationship between the ratios ($I_{phycoerythrin}/I_{B\text{-}CDs}$) of fluorescence emission peak intensities of phycoerythrin and B-CDs and the molar concentrations of phycoerythrin, the ratiometric fluorescent sensor for phycoerythrin is constructed. The linear detection range of molar concentration of phycoerythrin is 10-500 nM, and the detection limit is 8 nM.

The above disclosures are only described as some preferred embodiments of the present invention. It should be noted that those skilled in the art can also make several improvements and modifications without departing from the principles of the present invention, and these improvements and modifications shall still fall within the protection scope of the present invention.

What is claimed is:

1. A method for preparing a ratiometric fluorescent sensor for phycoerythrin based on a magnetic molecularly imprinted core-shell polymer, comprising the following steps:
   (1) preparation of aminated blue fluorescence-emitting carbon quantum dots (B-CDs) comprising:
   mixing 0.3 mL of 1,4-dioxane with 25 mL of catechol solution by ultrasound to obtain a first solution;
   transferring the first solution to a 50 mL high-pressure reactor with a polytetrafluoroethylene liner;
   heating the first solution in the high-pressure reactor for a first reaction at 180° C. for 12 hours to obtain a dark brown mixture; diluting the dark brown mixture with 20 mL of double-distilled water and centrifuging at 12,000 rpm to remove larger particles to obtain a supernatant;
   filtering the supernatant through a 0.4 m micro-filtration membrane to obtain a filtrate, and dialyzing the filtrate through a dialysis bag with a molecular weight cut-off of 1000 Da to remove unreacted experimental materials to obtain a second solution in the dialysis bag;
   collecting the second solution and subjecting to a rotary evaporation to remove 90% of water; and drying in a vacuum to obtain the B-CDs; and then dispersing the dried B-CDs in water to obtain a B-CDs aqueous dispersion;
   (2) preparation of carboxylated $Fe_3O_4$ magnetic nanoparticles comprising:
   adding ferric chloride and ferrous chloride with a molar ratio of 2:1 into a 250 mL reaction flask to prepare a 100 mL mixed solution;
   adding 10 mL of ammonia water with a mass concentration of 25% to the mixed solution into the 250 mL reaction flask under $N_2$ protection to obtain a third solution;
   stirring the third solution rapidly to cause a second reaction; adjusting pH of the third solution to alkaline with HCl after 10 minutes of the second reaction;
   adding 10 mL of trisodium citrate solution to the third solution to obtain a fourth solution; and then
   placing the 250 mL reaction flask containing the fourth solution in a water bath at 80° C. and continuously stirring the fourth solution for a third reaction for 30 minutes to obtain a first reaction production;
   obtaining the carboxylated $Fe_3O_4$ magnetic nanoparticles by centrifugation, washing and drying of the first reaction product and
   dispersing the carboxylated $Fe_3O_4$ magnetic nanoparticles in water to prepare a $Fe_3O_4$ aqueous dispersion;
   (3) preparation of magnetic molecularly imprinted core-shell polymers comprising:
   adding 2 mL of the B-CDs aqueous dispersion to 18 mL of aqueous dispersion containing 0.8 mL of the $Fe_3O_4$ aqueous dispersion to obtain a fifth solution;
   stirring the fifth solution for a period of 30 minutes, and then adding phycoerythrin and 20 μL of 3-aminopropyltriethoxysilane to the fifth solution to obtain a sixth solution and allowing reaction of the sixth solution to proceed for 1 hour; then
   adding 40 μL of ammonia water and 40 μL of tetraethyl silicate to the sixth solution to obtain a seventh solution, and allowing reaction to proceed in the seventh solution away from light for 12 hours to obtain a second reaction product;
   centrifuging the second reaction product; and washing three times with a solution consisting of ethanol and acetonitrile at a volume ratio of 8:2 to remove the template molecules to obtain a product, and
   obtaining $Fe_3O_4$/B-CDs/$SiO_2$ magnetic molecularly imprinted core-shell polymer ($Fe_3O_4$/B-CDs/$SiO_2$-MIPs) from the product by centrifugation, washing and drying; and then
   dispersing the $Fe_3O_4$/B-CDs/$SO_2$-MIPs in water to provide a $Fe_3O_4$/B-CDs/$SiO_2$-MIPs aqueous dispersion; and
   (4) adding a plurality of molar concentrations of phycoerythrin to the $Fe_3O_4$/B-CDs/$SiO_2$-MIPs aqueous dispersion to form a plurality of homogeneous mixtures;
   incubating the plurality of homogeneous mixtures away from light for 5 minutes and measuring fluorescence emission spectra of the plurality of homogeneous mixtures; and by fitting a linear relationship between ratios $I_{phycoerythrin}/I_{B\text{-}CDs}$ of fluorescence emission peak intensities of the phycoerythrin and the B-CDs and the plurality of molar concentrations of the phycoerythrin, the ratiometric fluorescent sensor for the phycoerythrin is constructed;
   wherein, in step (3), the mass concentration of the B-CDs is 1-10 mg/mL, the mass concentration of the carboxylated $Fe_3O_4$ magnetic nanoparticles is 5-20 mg/mL, and the plurality of molar concentrations of the phycoerythrin in step (4) is 0.5-1 M.

2. The method for preparing the ratiometric fluorescent sensor for the phycoerythrin based on the magnetic molecularly imprinted core-shell polymer according to claim 1, wherein, in step (1), a size of each of the aminated B-CDs is 1-5 nm.

3. The method for preparing the ratiometric fluorescent sensor for the phycoerythrin based on the magnetic molecularly imprinted core-shell polymer according to claim 1, wherein, in step (2), a size of each of the carboxylated $Fe_3O_4$ magnetic nanoparticles is 10-30 nm.

4. The method for preparing the ratiometric fluorescent sensor for the phycoerythrin based on the magnetic molecularly imprinted core-shell polymer according to claim 1, wherein, in step (4), a linear detection range of the molar concentrations of the phycoerythrin is 1-500 nM, and a detection limit of the phycoerythrin is 1-10 nmol/L.

* * * * *